United States Patent [19]

Gagliardi, Jr.

[11] Patent Number: 5,069,914
[45] Date of Patent: Dec. 3, 1991

[54] FOOD PRODUCT HAVING REDUCED LIKELIHOOD OF CHOKING

[75] Inventor: Eugene D. Gagliardi, Jr., West Chester, Pa.

[73] Assignee: Designer Foods, Inc., Wilmington, Del.

[21] Appl. No.: 440,965

[22] Filed: Nov. 22, 1989

[51] Int. Cl.[5] ............................................. A23L 1/317
[52] U.S. Cl. ........................................ 426/76; 426/92; 426/104; 426/105; 426/144; 426/646
[58] Field of Search ................ 426/92, 104, 105, 641, 426/646, 144, 76

[56] References Cited

U.S. PATENT DOCUMENTS

| | | | |
|---|---|---|---|
| 2,175,214 | 10/1939 | Robinson et al. | 426/76 |
| 2,475,408 | 7/1949 | Smelzer | 426/105 |
| 3,391,005 | 7/1968 | Babigan | 426/144 X |
| 3,717,473 | 2/1973 | Bissett | 426/76 |
| 3,786,703 | 1/1974 | Piel | 83/882 |
| 4,071,950 | 2/1978 | Telesio | 30/124 |
| 4,235,941 | 11/1980 | Coats | 426/104 X |
| 4,337,275 | 6/1982 | Adams | 426/144 X |
| 4,447,459 | 5/1984 | Balboni et al. | 426/144 |
| 4,816,281 | 3/1989 | Moriyama et al. | 426/144 |

Primary Examiner—Arthur L. Corbin
Attorney, Agent, or Firm—Panitch Schwarze Jacobs & Nadel

[57] ABSTRACT

A hot dog or other elongated food product having generally longitudinal slits extending along the entire length of the hot dog. The slits are preferably spaced around the circumference and extend radially from the outer surface toward, but not completely to, the center of the hot dog, thereby forming elongated segments, each having a cross section in the shape of a sector of a circle truncated at its apex. The unslit central core comprises a common link between the truncated sector shaped segments, which initially holds the segments in a generally unitized hot dog-shaped construction, any section of which readily fragments into small sized segments when severed from the whole by a bite which extends through the central core.

8 Claims, 3 Drawing Sheets

FIG. 9
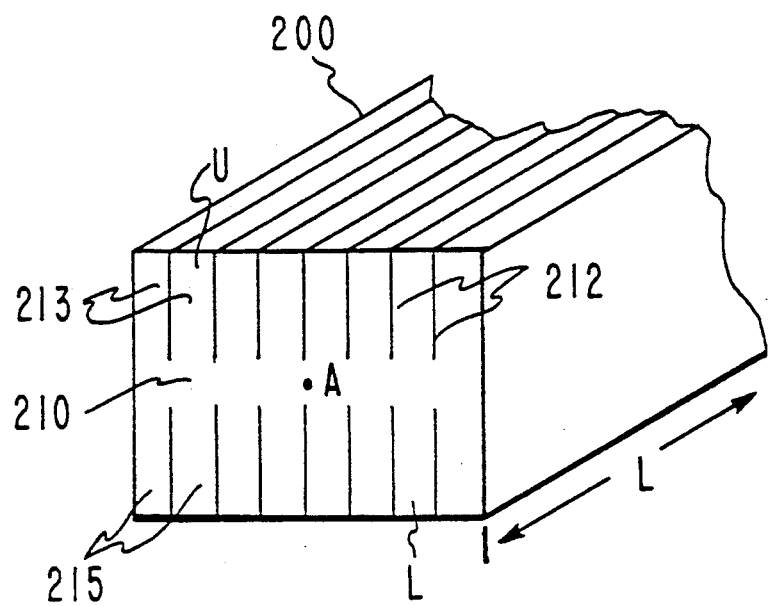
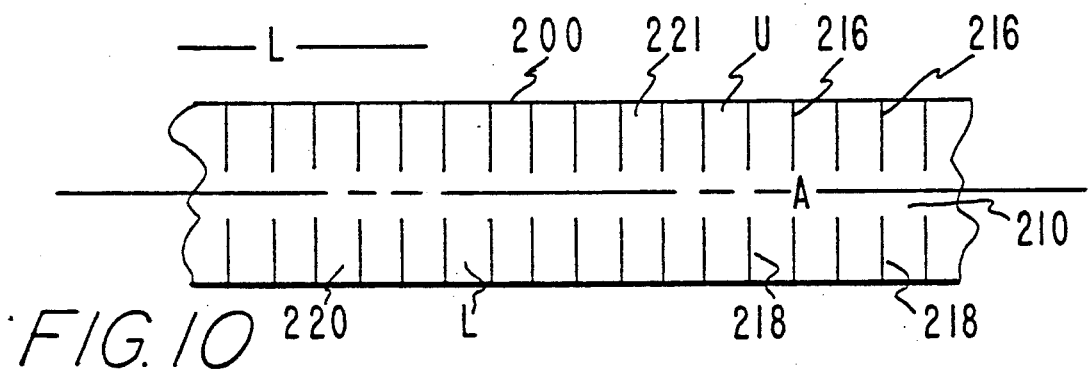
FIG. 10
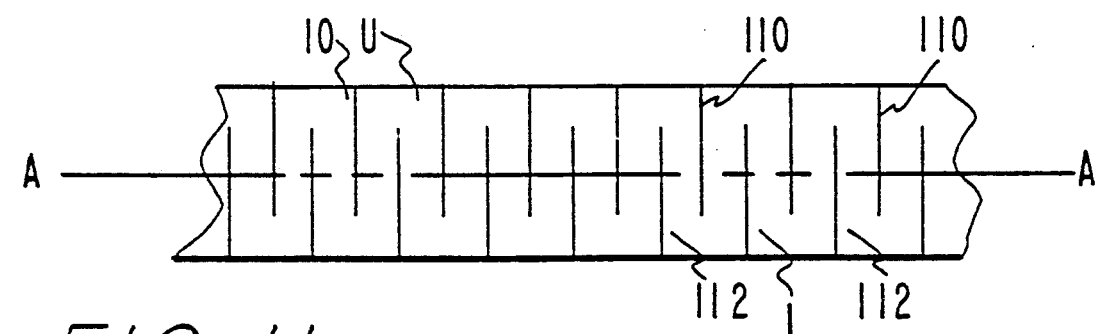
FIG. 11

FOOD PRODUCT HAVING REDUCED LIKELIHOOD OF CHOKING

FIELD OF THE INVENTION

The present invention relates generally to food products, specifically to elongated sausage-like food products such as hot dogs and, more particularly, to such food products having cuts which cause a bitten-off or severed section to break into small pieces or segments to reduce the chance a consumer of choking on the food product.

BACKGROUND OF THE INVENTION

Choking on small toys or toy parts has long been identified as a common cause of early childhood injury and fatality. In response to this threat to children's safety, the Federal Consumer Products Safety Commission (hereafter FCPSC), through its regulations, specified minimum sizes for separate or separable parts of toys which are intended for children's use. FCPSC's theory was that young children could be expected to put toys in their mouths and they were less likely to choke on large than on small toy parts.

By contrast, it has been found that children, as well as adults, are more likely to choke on large food items than on small food items. Hot dogs, and other similarly shaped food products, have been identified as a primary source of food involved in the death and injury of small children and others who have choked on their food. For example, a 1980 study of causes of childhood choking deaths in Maryland over the period from 1970 to 1978 disclosed that of twelve childhood deaths caused by choking on food, six involved hot dogs.

The present invention resulted from the identification of the cause of such choking problems, that is: young children who are eager to eat adult food and through lack of teeth, over-excitement, upset or various other reasons, bite off and attempt to swallow a large piece of a hot dog before adequately chewing it, thereby running the risk of aspirating and thereby choking on a large hot dog piece.

SUMMARY OF THE INVENTION

Briefly stated, the present invention comprises an elongated food product having a central axis extending along its length and two portions, a segmented portion comprised of at least two segments that are separable from each other, and an unsegmented portion which is substantially contiguous to the segmented portion. A consumer's biting into the food product generally perpendicular to the central axis results in the separation of the segments, creating in the mouth of the consumer small food pieces relative to the size of the bitten-off section to reduce the likelihood of choking on the food product.

In one preferred construction the invention comprises an elongated food product having a generally cylindrical outer surface, a length and a longitudinal centerline traversing the length of the food product. The food product further comprises an array of at least two generally radial lengthwise cuts, each cut residing in a plane containing the centerline, with each cut extending from the outer surface of the food product inwardly to a predetermined, substantially uniform distance from the centerline, thereby providing an unsegmented generally cylindrical inner portion and a segmented outer portion having at least two separable segments, each segment having as a cross-sectional shape a sector of a circle truncated at its apex, each segment further being contiguous with and connected to the unsegmented inner portion.

BRIEF DESCRIPTION OF THE DRAWINGS

The foregoing summary, as well as the following detailed description will be better understood when read in conjunction with the appended drawings. For the purpose of illustrating the invention, there is shown in the drawings embodiments which are presently preferred, it being understood, however, that this invention is not limited to the precise arrangements and instrumentalities shown. In particular, in all references to "hot dog" the term is meant to include any and all food products of a uniform or non-uniform composition or of any cross-sectional shape including square or trapezoidal. Though the drawings generally illustrate generally straight hot dogs, it should be expressly understood that all embodiments of the present invention also apply to curved hot dogs, and references to planes in those cases should also be understood to include curvilinear surfaces otherwise having the described properties.

In the drawings:

FIG. 9 is an end elevational view of a hot dog similar to that shown in FIG. 8, but having a trapezoidal cross section;

FIG. 10 is a side elevational view of a hot dog similar to that shown in FIG. 8, except that the segmenting parallel cuts in the opposed portions are generally transverse to a centerline; and FIG. 11 is a side elevational view of a hot dog which includes parallel transverse cuts which alternately penetrate the upper and the lower surfaces of the hot dog.

DESCRIPTION OF THE PREFERRED EMBODIMENT

Figure 1:
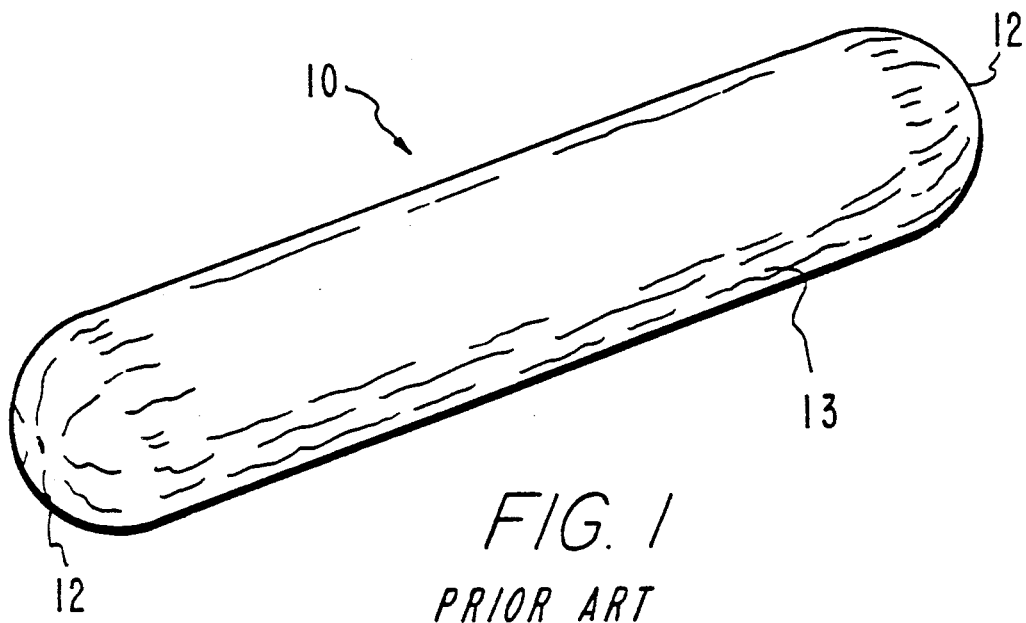
FIG. 1 is a perspective view of a hot dog which is typical of the related art and of the food products which have caused the deaths, by choking, of consumers, particularly infants and children.

Referring to the drawings, wherein like references are used to indicate like elements, there is shown in FIG. 1 is a perspective view of a hot dog 10, typical of the class of food products which have been involved in the choking deaths of children and adults. The composition of the hot dog 10 is generally a ground mix of beef or other meat, cereal and fat formed into a cylindrical shape with substantially hemispherical ends 12. The hot dog 10 may include an outer casing or skin 13 which encloses and retains the remainder of the ground mix material. The hot dog 10 has typical dimensions of 0.625 inches (15.9 mm) in diameter and 5 inches (127 mm) length, though other dimensions are common, especially greater length for hot dog products and greater diameter in similar food products known as sausages or wursts.

Choking on food products, such as hot dogs by children and adults, has been associated with the relatively large diameter of the food product relative to the windpipe diameter of the victim. Aspiration of a generally cylindrical piece of food having the diameter of a typical hot dog may result in partial or total blockage of the windpipe. Unless the blockage is expeditiously cleared, asphyxiation of the victim may result. The following discussion presents detailed descriptions of several preferred embodiments of hot dogs and similarly shaped food products which preserve the desirable external texture and appearance of the hot dog or food product while providing separation within mouth of a consumer, such as a child, of large chokable-sized sections, into smaller pieces for which aspiration and/or choking is less likely to occur.

Figure 2:
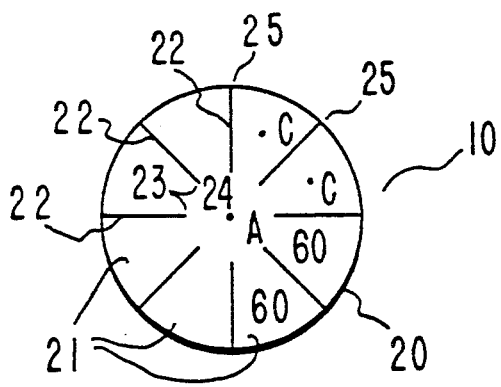
FIG. 2 is an end elevational view of the hot dog of FIG. 1 including generally radial segment-forming cuts of a uniform depth and spacing in accordance with a first embodiment of the present invention.

FIG. 2, illustrating a first preferred embodiment of the present invention, is an end view in elevation of a hot dog 10, like that illustrated in FIG. 1, but modified in accord with the present invention. The hot dog 10 of FIG. 2 has an outer circumferential surface 20 and includes a generally segmented portion 21 formed in the general shape of a thick-walled hollow cylinder surrounding and engaging an unsegmented generally solid or continuously cylindrical core portion 24. Centerline A, also called central axis A, is an imaginary line which traverses the length of the hot dog 10. The segmented portion 21, includes a plurality (in this embodiment, eight) of generally radial cuts 22, each cut extending along the entire length of the hot dog 10. The cuts 22 each have a radial inner end 23 spaced substantially uniformly from centerline A, and a radial outer end 25 which intersects the outer surface 20 of the hot dog 10. Each of the radial cuts 22 is in a generally radially extending plane (not shown) traversing and containing the centerline A. In the present embodiment, each of the planes containing the cuts 22 are circumferentially spaced from the adjacent planes by an angular distance of about 45°, thereby providing eight uniformly spaced cuts 22 and eight segments 60 of substantially equal size, shape and volume. Each of the segments 60 has a radial cross section which is in the general form of a sector of a circle truncated at its apex. All the segments 60 are coalesced with the unsegmented core portion 24 by the food material which is common to the core portion 24 and to the segments 60 adjacent the inner ends 23 of the cuts 22.

The depth of the cuts 22 and the angular distance between the cuts determining the number of segments 60, are matters of design choice and may depend on the diameter and the consistency of the food material constituting the hot dog 10. In a hot dog having a smaller diameter, for example, 0.5 inches (12.7 mm), the radial cuts 22 preferably terminate about 0.13 inches (3.3 mm) from center-line A, generating an unsegmented portion 24 having a typical diameter of about ¼ inch. In a hot dog having a larger outer diameter, for example 1.0 inch (25.4 mm), the radial cuts preferably terminate about 0.2 inches (5.1 mm) from centerline A generating an unsegmented portion about 0.4 inches in diameter. The number of segments 60 could vary from as few as two segments in a small hot dog to as many as 20 or more segments in a large sausage or wurst.

Figure 3:
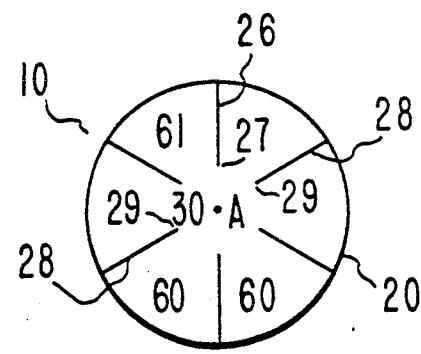
FIG. 3 is an end elevational view of a second embodiment of a hot dog of the present invention including uniformly spaced radial cuts having different depths.

Referring now to FIG. 3, there is illustrated a second embodiment of the present invention. As in FIG. 2, the hot dog 10 is divided into an outer segmented portion 61 in the form of a thick-walled hollow cylinder surrounding an inner unsegmented portion 30. Radial cuts 26 and 28 extend along the entire length of the hot dog 10 and are positioned in planes radially traversing and containing centerline A. The cuts 26 and 28 are circumferentially spaced apart by angular distances of about 60 degrees, thereby providing six cuts 26, 28 generally equally spaced, and six segments 60. Cuts 26 begin at the outer surface 20 of the hot dog 10 and have a first depth terminating cuts 26 at point 27, a first predetermined distance from centerline A. Cuts 28 also begin at the outer surface 20 of the hot dog 10 but have a second, lesser depth terminating at point 29 a second predetermined distance from centerline A, the second distance being greater than the first distance. Thus, radial cuts 26 extend more closely to the centerline A than adjacent radial cuts 28.

Figure 5:
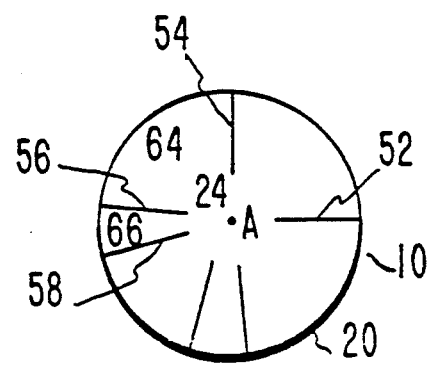
FIG. 5 is an end elevational view of a fourth embodiment of a hot dog of the present invention including non-uniformly spaced radial cuts which form segments of unequal cross-sectional area.

FIG. 5 illustrates another embodiment of the present invention. In FIG. 5 the hot dog 10 has outer surface 20, within which lays a segmented portion traversed by radial cuts 52, 54, 56 and 58 which are positioned in an irregular array in which the angular distances between adjacent cuts are not always equal to each other. For example, cuts 54 and 56 are circumferentially spaced about 80°-85°, forming between them segment 64 which occupies a larger angular portion of the hot dog 10 than segment 66 formed by cuts 56 and 58 which are circumferentially spaced about 15°. The provision of segments of different sizes within a given hot dog, so long as even the largest segment meets size restriction imposed by the non-choke objective, provides an interesting variety of tactile responses achieving the desired non-choke effect when consumed, along with a desirable texture difference which may also appeal to the consumer.

Figure 6:
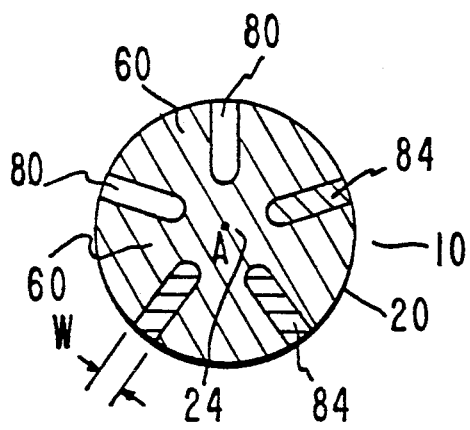
FIG. 6 is a sectional view of a fifth embodiment of a hot dog of the present invention including radial cuts in the form of slots, and further including food of a second composition filling at least some of the slots.

FIG. 6 shows, in a sectional elevational view, a version of the present invention which further includes a secondary food substance. In FIG. 6, the hot dog 10, has outer surface 20 and a cylindrical outer portion comprised of segments 60 positioned to surround an unsegmented core portion 24 having a centerline A. The cylindrical outer portion is divided into segments 60 by a plurality of generally radially extending cuts which, in this embodiment, are in the form of slots 80. Slots 80 lay in planes which contain centerline A and begin at the outer surface 20 of hot dog 10 and proceed inwardly to, but not into, the unsegmented core portion 24 which serves to initially hold the individual segments 60 together. Each of the slots 80 has a predetermined width W which at the outer surface 20 is typically about 5% of the circumference of the hot dog 10, but which may taper inwardly toward the core portion 24. The radial depth of the slots 80 may vary. At least some of the slots 80 are filled with another food material 84 which may be identical with or similar to the food material of the bulk of the elongated food product 10, such as chili, but, more desirably, will be a flavoring material or a complementary food substance, such as mustard, cheese or dough or a material to facilitate cooking and/or browning, such as fat.

Figure 7:
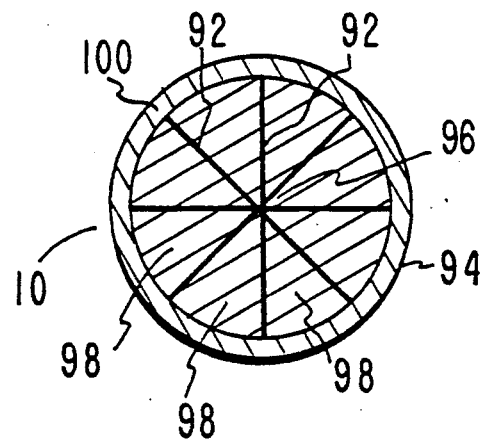
FIG. 7 is a sectional elevational view of still another embodiment of the hot dog of the present invention including an unsegmented portion which is positioned on the outer periphery of the hot dog, rather than at the core.

FIG. 7 is an end elevational view in cross section illustrating another embodiment of the present invention in which the unsegmented portion 100 is on the periphery and has the form of an exterior layer or thin-walled hollow cylinder surrounding the segmented portion, rather than residing in the core of the hot dog 10 as described in the above-discussed embodiments. In FIG. 7, the hot dog 10 has a peripheral surface 94 immediately surrounding the unsegmented portion 100 which, in turn, surrounds the segmented portion comprised of individual segments 98. In the present embodiment, the segments 98 are eight in number and are all of the same size. Also in the embodiment shown in FIG. 7 the cuts 92 which establish the sgements 98 extend all the way to the centerline. However, if desired, the cuts 92 could terminate a short distance from the centerline (not shown) in the manner shown in FIG. 2 to establish a central, generally continuous core. In addition, a greater or lesser number of segments and/or segments of differing sizes may alternatively be provided. The unsegmented portion 100 may be of the same material as the segments 98, but, in an alternate construction, could be formed of a material different from that of segments 98, such as a dough, bread, batter, cheese coating or some other suitable material. The unsegmented portion 100 may be applied by extrusion or may be fabricated from the material of the segments themselves by abrading or otherwise treating the surface to terminate the cuts 92 proximate the outer surface 94 of the hot dog 10, thereby leaving the cuts 92 intact within the body of the hot dog 10. The exterior layer in the form of unsegmented portion 100 provides the appearance of a traditional hot dog or sausage while maintaining the desired characteristics of a frangible choke-resistant food product. The segmented portion is shown in FIG. 7 to be traversed by radial slit-like cuts 92. Alternate embodiments of the present invention contemplate radial cuts which do not meet, non-radial cuts, parallel cuts whose planes are substantially parallel to a centerline and parallel cuts in planes which are substantially transverse to a centerline.

Figure 8:
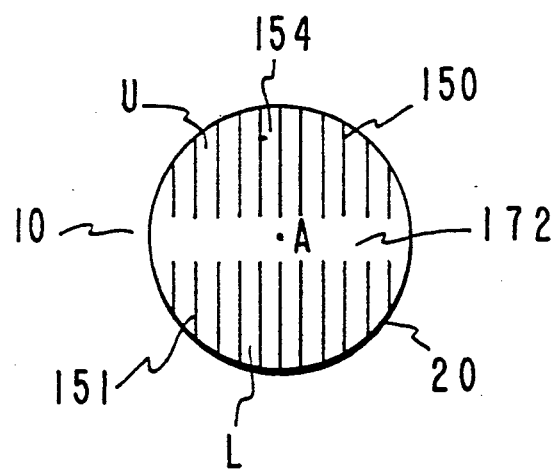
FIG. 8 is an end elevational view of another embodiment of a hot dog of the present invention including two opposed segmented portions, both having generally parallel longitudinal cuts, and an unsegmented portion positioned between and contiguous to the opposed segmented portions.

FIGS. 8, 9 and 10 are elevational views of embodiments of the present invention having in common a pair of opposed segmented portions separated by a contiguous, generally slab-shaped unsegmented portion. In FIG. 8, the hot dog 10 has a substantially circular cross section, an outer surface 20, an upper or first segmented portion U and a lower or second segmented portion L. A slab-shaped, unsegmented layer 172 is located between and is contiguous to the upper segmented portion U and the lower segmented portion L. Multiple parallel cuts 150 lay in planes which are substantially parallel to a centerline A and serve to divide the upper segmented portion U into a plurality of elements or segments 154. Each cut 150 traverses the length of hot dog 10 and is sufficiently deep to reach but not penetrate the unsegmented portion 172. Lower parallel cuts 151 are similar to the upper cuts 150, except that they intersect and divide the lower segmented portion L and proceed upwardly until they reach, but do not penetrate, the unsegmented portion 172. The cuts 150 and 151 are not precisely aligned with each other in this embodiment but they may be so aligned, if desired. The unsegmented portion 172 acts as a core which serves to initially interconnect the upper and lower segments 212 and 214 until a section is bitten off by a consumer.

FIG. 9 is an end elevational view in perspective of an embodiment of the present invention in which hot dog 200 has a generally trapezoidal or rectangular cross section. Since a rectangle is a subset of the class of figures called trapezoids, trapezoid is a suitable generic name for the class of shapes intended to be described. Like the embodiment of FIG. 8, there is an upper or first segmented portion U and a lower or second segmented portion L. Cuts 212, positioned in parallel planes which are themselves parallel to a centerline A, traverse the length of the trapezoidal hot dog 200, and divide the upper segmented portion into segments 213. In like manner, cuts 214 positioned in parallel planes which are themselves parallel to centerline A, traverse the length of the hot dog 200, and divide the lower segmented portion L into segments 215. Again, the cuts 212 and 214 need not be aligned. The unsegmented slab-shaped portion 210 lays between the upper surface U and the lower surface L and is reached by, but not penetrated by, the longitudinal cuts 212 penetrating the upper segmented portion U and the longitudinal cuts 214 which penetrate the lower segmented portion L.

FIG. 10 is a side elevational view of another embodiment of a hot dog 200 fabricated according to the teachings of the present invention. In FIG. 10, the cross section of the hot dog can be of any shape. Typical suitable shapes are round, square, oval rectangular or trapezoidal. The upper or first segmented portion U is positioned contiguous to and above the unsegmented portion 210. The lower or second segmented portion L is positioned beneath and contiguous to the unsegmented portion 210. Cuts 216 and 218 are positioned in parallel planes which are generally perpendicular to centerline A and serve to divide the upper portion U and the lower portion L, respectively, into upper groups of segments 221 and lower groups of segment 220, respectively. The upper and lower groups of segments 220 and 221 share material with the unsegmented portion 210 and are held in the desired hot dog shape until eaten.

Figure 4:
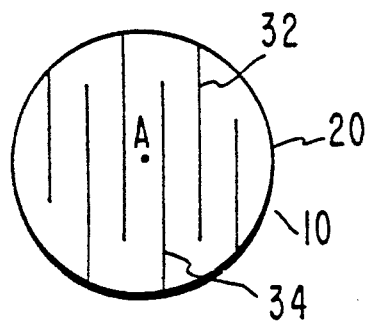
FIG. 4 is an end elevational view of a third embodiment of a hot dog of the present invention including generally parallel lengthwise cuts.

FIG. 4 is an elevational end view of a hot dog showing yet another version of the present invention and FIG. 11 is an elevational side view of a hot dog showing a second generally similar embodiment of the present invention. FIGS. 11 and 4 are similar in that in both figures the hot dogs are divided into segments by a series of substantially parallel cuts which alternately penetrate the upper and lower portions of the hot dog 10. In FIG. 4, cuts 32 which traverse the length of the hot dog 10 and are substantially parallel to centerline A penetrate the upper or first portion of the hot dog 10 without penetrating the lower or second hot dog portion and alternate adjacent parallel cuts 34 penetrate the lower surface of the hot dog without penetrating the upper hot dog portion. By contrast, in the structure of FIG. 11, the segmenting cuts 110 and 112, which alternately cut the upper portion U only and the lower surface L only of the hot dog 10, are positioned in planes which are substantially transverse to the centerline A. In the structures of both FIGS. 4 and 11, any other relative arrangement of cuts such as three adjacent cuts within the upper portions adjoined by a group of three adjacent cuts within the lower portion would satisfactorily perform the objectives of the invention.

From the forgoing description it can be seen the present invention comprises a hot dog which can be consumed by young children or others with minimum fear of choking. It will be appreciated by those skilled in the art that changes could be made to the embodiments described above without departing from the broad inventive concepts thereof. It is understood therefore that this invention is not limited to the particular embodiments disclosed herein but is intended to cover all modifications which within the scope and spirit of the invention as defined by the appended claims and equivalents thereto.

We claim:

1. An elongate meat product having a top surface, a bottom surface, a length and a central axis extending along the length, said meat product comprising an unsegmented first portion and a second portion substantially contiguous to the first portion extending generally parallel to the central axis, said second portion comprising at least two separable segments, said meat product further comprising a segmented third portion, the unsegmented first portion comprising a layer positioned generally midway between the top surface and the bottom surface, the segmented second portion extending between the first portion and the top surface and the segmented third portion extending between the first portion and the bottom surface, said first portion and said segments being sized such that a consumer's biting into the meat product generally perpendicular to and through the central axis results in said segments being readily separated to reduce the likelihood of choking on the meat product.

2. A meat product as recited in claim 1, wherein a cross section of the product taken perpendicular to the central axis has a shape selected from the group consisting of: substantially trapezoidal and substantially circular.

3. A meat product as recited in claim 1 wherein the segments of the second and third portions are substantially planar and generally parallel to each other.

4. A meat product as recited in claim 3 wherein the segments are formed by a plurality of cuts extending generally perpendicular to the central axis.

5. A meat product as recited in claim 3 wherein the segments are formed by a plurality of cuts extending generally parallel to the central axis.

6. An elongated meat product having a top surface, a bottom surface and a central axis, the meat product having a cross section selected from the group consisting of substantially circular and substantially trapezoidal, said meat product further comprising an array of slits traversing the meat product a distance greater than one-half a distance between said top and bottom surfaces, said slit array comprising a first group of slits penetrating the top surface and not the bottom surface, and a second group of slits penetrating the bottom surface and not the top surface, said slit array comprising alternating slits from the first and second groups such that a consumer's biting into the meat product generally perpendicular to and through the central axis results in segments which are readily separable to reduce the likelihood of choking on the meat product.

7. An elongated food product having a length and a central axis extending along the length, said food product comprising an unsegmented first portion and a second portion substantially contiguous to the first portion extending generally parallel to the central axis, said unsegmented first portion having the form of a hollow cylinder, said second portion comprising at least two separable segments having the aggregate shape of a generally continuous cylinder substantially filling the hollow cylinder formed by the first portion, said first portion and said segments being sized such that a consumer's biting into the food product generally perpendicular to and through the central axis results in said segments being readily separated to reduce the likelihood of choking on the food product.

8. A food product as recited in claim 7, wherein each segment has a length substantially equal to the product length and wherein each segment has a cross-sectional shape of a sector of a circle.

* * * * *